United States Patent
Jin et al.

(10) Patent No.: US 7,831,269 B2
(45) Date of Patent: Nov. 9, 2010

(54) SYSTEM AND ASSOCIATED METHOD FOR FACILITATING PUSH-TO-TALK COMMUNICATIONS

(75) Inventors: Xin Jin, Ottawa (CA); Wen Zhao, Kanata (CA)

(73) Assignee: Research In Motion Limited, Waterloo (CA)

( * ) Notice: Subject to any disclaimer, the term of this patent is extended or adjusted under 35 U.S.C. 154(b) by 772 days.

(21) Appl. No.: 11/185,898

(22) Filed: Jul. 21, 2005

(65) Prior Publication Data

US 2007/0021132 A1 Jan. 25, 2007

(51) Int. Cl.
*H04B 7/00* (2006.01)

(52) U.S. Cl. .................. 455/518; 455/90.2; 455/519

(58) Field of Classification Search .............. 455/90.2, 455/412.1, 414.1, 517–520, 78, 79, 500, 455/426.1, 422.1, 416, 420; 370/352, 389, 370/338, 328, 327, 340

See application file for complete search history.

(56) References Cited

U.S. PATENT DOCUMENTS

| | | | | |
|---|---|---|---|---|
| 5,214,688 A * | 5/1993 | Szlam et al. | ........... | 379/266.08 |
| 6,031,832 A | 2/2000 | Turina | | |
| 2001/0033579 A1 | 10/2001 | Nelson, Jr. et al. | | |
| 2002/0082032 A1 | 6/2002 | Hunzinger | | |
| 2002/0196742 A1 | 12/2002 | Baker et al. | | |
| 2003/0008657 A1 | 1/2003 | Rosen et al. | | |
| 2003/0148785 A1 | 8/2003 | Mangal et al. | | |
| 2004/0015553 A1 * | 1/2004 | Griffin et al. | ........... | 709/206 |
| 2004/0249949 A1 * | 12/2004 | Gourraud et al. | ........... | 709/227 |
| 2005/0009548 A1 | 1/2005 | Kelley et al. | | |
| 2005/0143135 A1 * | 6/2005 | Brems et al. | ........... | 455/564 |
| 2005/0227701 A1 * | 10/2005 | Khawand | ........... | 455/453 |
| 2005/0239487 A1 * | 10/2005 | Glass et al. | ........... | 455/519 |
| 2006/0040683 A1 * | 2/2006 | Lappalainen et al. | ........... | 455/466 |
| 2006/0058052 A1 * | 3/2006 | Plestid et al. | ........... | 455/519 |
| 2006/0084457 A1 * | 4/2006 | Laha et al. | ........... | 455/519 |
| 2006/0121923 A1 * | 6/2006 | East | ........... | 455/518 |

FOREIGN PATENT DOCUMENTS

| | | |
|---|---|---|
| EP | 711089 | 5/1996 |
| WO | WO 97/00585 A | 1/1997 |

OTHER PUBLICATIONS

Canadian Office Action, Application No. 2550561, dated Oct. 7, 2008.
EP05254543 Communication pursuant to Article 96(2) EPC dated Feb. 23, 2006.

* cited by examiner

*Primary Examiner*—Duc Nguyen
*Assistant Examiner*—Dominic E Rego
(74) *Attorney, Agent, or Firm*—Moffat & Co.

(57) ABSTRACT

A push-to-talk (PTT) mobile station having a PTT ready mode, the mobile station having a controller adapted for executing computer program code; a memory connected to the controller for storing computer program code; computer program code stored in the memory and executable by the controller for operating the mobile station in the PTT ready mode selected from a plurality of PTT ready mode techniques, for establishing a PTT session; and a radio subsystem connected to the controller and the memory, the subsystem being configured for enabling the PTT mobile station to operate in the PTT ready mode for establishing one of the PTT session, PTT traffic, or both the PTT session and PTT traffic.

6 Claims, 4 Drawing Sheets

SYSTEM AND ASSOCIATED METHOD FOR FACILITATING PUSH-TO-TALK COMMUNICATIONS

FIELD OF THE APPLICATION

The present application relates to push-to-talk communications and in particular to the optimization of battery life and the grade of service quality for push-to-talk communications.

BACKGROUND

A wireless communication device, such as a cellular telephone or mobile station, is capable of making and receiving voice calls and/or sending and receiving data over wireless communication networks. Recent developments, including, for example, Integrated Digital Enhanced Networks (iDen), have given such wireless devices the ability to communicate in "push-to-talk" (PTT) modes using push-to-talk over cellular (PoC) technology.

PoC communication may be adapted for one-to-one talks or group talks which are session based. For example, the user of a mobile station may send an "invitation" for PoC communication to the other participants who may accept or ignore the invitation. When an invitation is accepted, a PoC session is created between the two participants. Further acceptances of the invitation will expand the session into a group session having more than two participants. Thus, teleconferences may be conducted or chat rooms and ad-hoc group sessions may be formed.

One of the most significant advantages of PTT, though, is that it allows for what is referred to as "all-the-time" high-availability service, ensuring substantial continuity of service to subscribers. As a consequence, calls that are initiated may be completed with little or virtually no connect time, in contrast to that associated with conventional cellular phones that must wait while "dialing". Thus, by using PTT, call connections may be established much quicker, resulting in much faster response times than is possible using conventional cellular phone technologies.

To support such quick response times the receiving mobile station in a PTT mode must be configured to periodically check a paging channel for receipt of a paging signal. When in PTT mode, this check must be performed more frequently than in a conventional cellular phone service. More frequent checks, as will be appreciated, drain resources on the mobile station more quickly, resulting in reduced battery life available for the mobile station.

Therefore, what is needed is a push-to-talk system in which the mobile station can be configured to optimally use battery resources while maintaining a quality of service desirable for the user.

BRIEF DESCRIPTION OF THE DRAWINGS

The present application will be better understood with reference to the drawings in which.

DETAILED DESCRIPTION

The present application overcomes the deficiencies of the prior art by providing a means for a user to select one or more PTT ready modes depending on the user's requirements for battery life and for quality of service. Specifically, various PTT ready mode options exist, including switching to a non-slotted mode, in a slotted mode reducing the time slot duration, in a slotted mode using multiple numbers staggered on the paging channel, the assignment of a separate paging channel, the assignment of the same paging slot to multiple users when in the same cell sector, assigning a dedicated/lower loaded access channel, increasing the initial power level of signals, assigning a lower loaded radio frequency channel, or using a gated traffic channel. These PTT options can be used alone or in combination with each other according to the table presented below in the Detailed Description section. Based on this, a user can customize the level of service that he or she desires when ensuring that battery is adequate for the user's purposes.

The present application therefore provides a push-to-talk (PTT) mobile station having a PTT ready mode, the mobile station comprising: a controller adapted for executing computer program code; a memory connected to said controller for storing computer program code; computer program code stored in said memory and executable by said controller for operating said mobile station in said PTT ready mode selected from a plurality of PTT ready mode techniques, for establishing a PTT session; and a radio subsystem connected to said controller and said memory, said subsystem being configured for enabling the PTT mobile station to operate in the PTT ready mode for establishing one of the PTT session, PTT traffic, or both the PTT session and PTT traffic.

The present application further provides a method for configuring a Push-to-Talk (PTT) mobile station comprising the steps of: enabling a user to select a PTT ready mode by using one or multiple techniques selected from a plurality of techniques for building the PTT ready mode; configuring the mobile station for the PTT ready mode selected; and sending a configuration message to a base station to configure a PTT service based on the PTT ready mode selected.

The present application yet further provides a system to configure a push-to-talk (PTT) session between two or more mobile stations comprising: a base station, the base station adapted to receive a configuration message from a user and configure the PTT session pursuant to the configuration message; and the mobile stations, each mobile station having: a controller adapted for executing computer program code; a memory connected to said controller for storing computer program code; computer program code stored in said memory and executable by said controller for operating said mobile station in a PTT ready mode using one or multiple techniques selected from a plurality of techniques for establishing a PTT session; and an interface connected to said controller and said memory, said interface being configured for enabling a user to select the PTT ready mode using the one or multiple techniques for establishing the PTT session.

The present application yet further provides a method for configuring a Push-to-Talk (PTT) mobile station comprising the steps of: enabling a user to select a PTT ready mode by using one or multiple techniques selected from a plurality of techniques; sending a message to a base station to request a PTT ready mode for PTT service based on the one or multiple techniques selected; negotiating with the base station for agreement for the PTT ready mode; and configuring the mobile station for the PTT ready mode agreed to.

In the following discussion, numerous specific details are set forth to provide a thorough understanding of the present invention. However, it will be obvious to those skilled in the art that the present invention may be practised without such specific details. In other instances, well-known elements have been illustrated in schematic or block diagram form in order not to obscure the present invention in unnecessary detail. Additionally, for the most part, details concerning push-to-talk communications, timing considerations, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a controller in accordance with code. As used herein, the term "controller" shall include and be used to refer to any one or more of a microcontroller, a processor, a data processor, an electronic data processor (EDP), a microprocessor, an application-specific integrated circuit (ASIC), a device (e.g., a personal digital assistant (PDA), a mobile telephone, or the like), a computer, a personal computer (PC) and/or the like. Furthermore, as used herein, the term "code" shall be used to include and refer to any one or more of program code, software, integrated circuits, read-only memory (ROM), and/or the like, effective for instructing the data processor how to perform such functions. Still further, it is considered that the design, development, and implementation details of all such code would be apparent to a person having ordinary skill in the art based upon a review of the present description of the invention.

Figure 1:
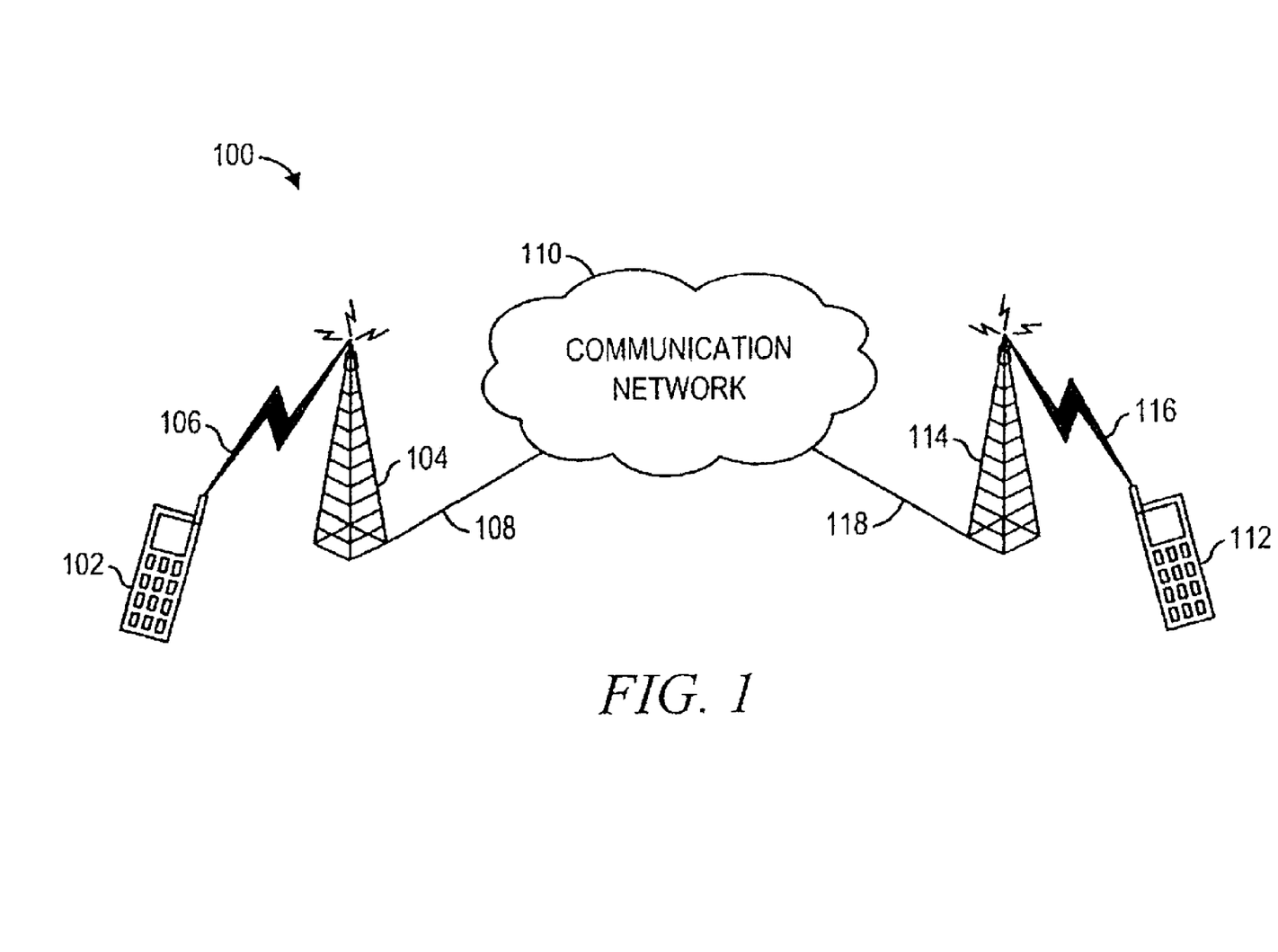
FIG. 1 is a schematic drawing showing a telecommunications network.

Referring to FIG. 1 of the drawings, the reference numeral 100 generally designates a wireless communications network embodying features of the present invention. The network 100 includes a first wireless communication device 102, referred to herein as a first mobile station 102. The first mobile station 102 is configured for communication in "push-to-talk" (PTT) modes with a first base station transceiver system, referred to herein simply as a first base station, 104, described in further detail below with respect to FIG. 2, via a radio frequency (RF) channel carried on a wireless link 106. The first base station 104 is connected via a link 108 to a telecommunications network 110. A second mobile station 112 is configured for communication in PTT modes with a second base station 114 via an RF channel 116. The second base station 114 is connected via a link 118 to the network 110. It is understood that, as used herein, the term "PTT" shall include, though not be limited to PTT modes utilizing Push-to-talk over Cellular (PoC) technology.

It may be appreciated that communication of signals between the mobile phones 102 and 112 may be facilitated by the network of base stations 104 and 114, and the communication network 110. Furthermore, while not shown, additional mobile phones, such as the mobile stations 102 and 112, may communicate with the mobile stations 102 and 112 and each other via RF channels to base stations connected to the network 110.

Figure 2:
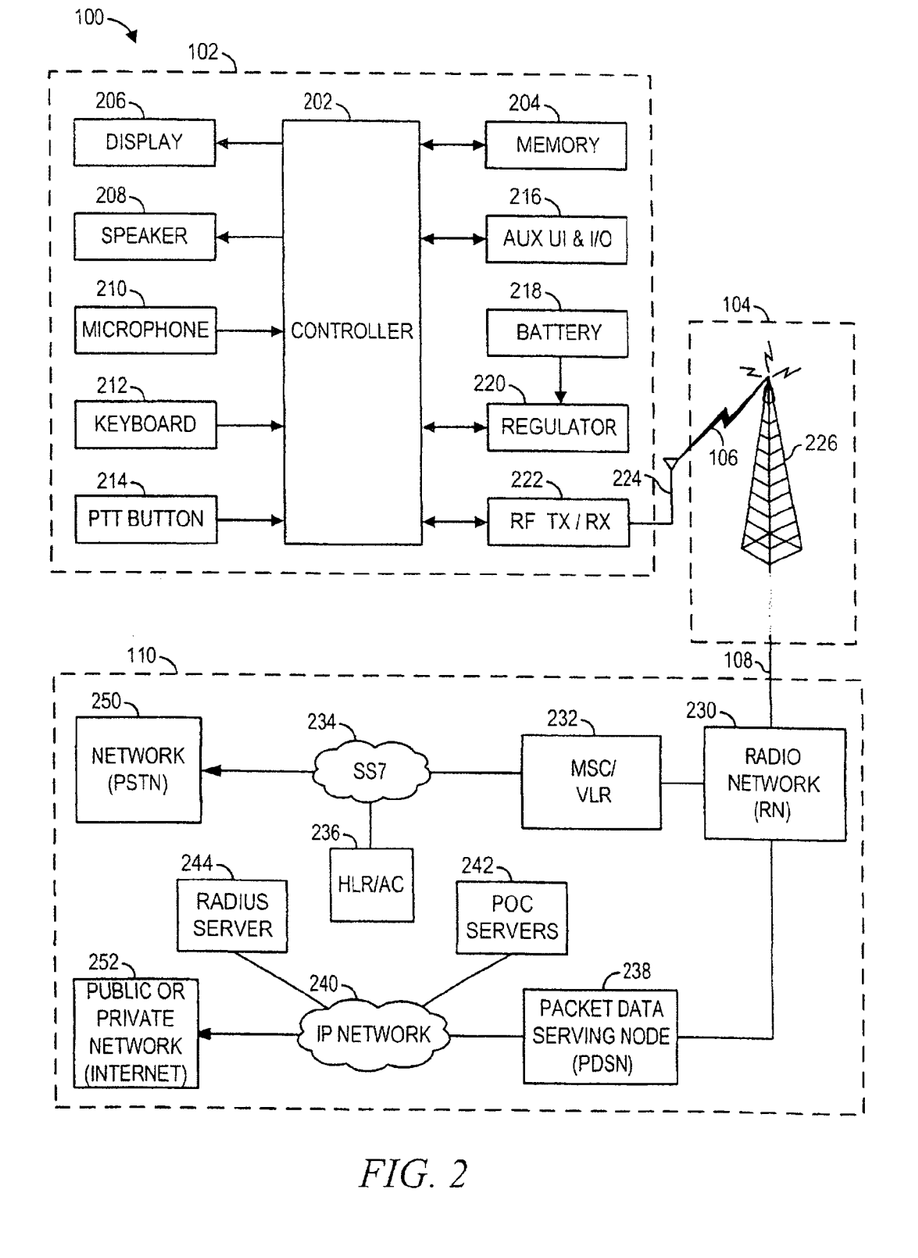
FIG. 2 is a block diagram of a mobile station and network utilized in FIG. 1.

FIG. 2 is a block diagram depicting in greater detail the mobile station 102, the base station 104, and a portion of the communication network 110. The details depicted in connection with the mobile station 102 and the communication network 110 are considered herein to be respectively representative of the mobile station 112 and other mobile stations and communication networks generally.

The mobile station 102 is preferably a two-way communication device preferably including voice and advanced data communication capabilities, including the capability to communicate with other computer systems. Depending on the functionality provided by the mobile station 102, it may consist of a single unit which may function as, and be referred to as, a data communication and/or messaging device, a cellular telephone (or simply cell phone) with or without data messaging capabilities, a multiple-function communication device with data and/or voice communication capabilities, a two-way pager, a personal digital assistant (PDA) configured for wireless communication, a wireless portable computer, a computer incorporating a modem, a wireless Internet appliance, or a data communication device (with or without telephony capabilities). Alternatively, and as exemplified further below, the mobile station 102 may constitute a multiple-module unit comprising a plurality of separate components, including but in no way limited to a computer or other device connected to a wireless modem. The mobile station 102 may communicate with any one of a plurality of base stations 104 within its geographic coverage area.

The mobile station 102 preferably includes a controller 202 coupled to a memory 204, and embodied as a central processing unit (CPU) operable for executing computer program code and operating system software residing in the memory 204. The memory 204 may comprise any suitable internal and/or external (with suitable interface), removable and/or non-removable, volatile and/or non-volatile memory, flash memory, random access memory (RAM), and/or the like. By way of example, external memory may comprise a Subscriber Identity Module (SIM) or a Removable User Identity Module (R-UIM) to facilitate identification to a network of a subscriber or user of a mobile station accessing the network. Alternatively, the mobile station 102 may operate based on configuration data programmed by a service provider into an internal memory. Memory is considered to be well-known in the art and, therefore, will not be described in further detail herein.

A visual display 206 is connected to the controller 202 for displaying received information, stored information, user inputs, and the like. A speaker 208 and microphone 210 are coupled to the controller 202 for projecting and receiving audible sounds, such as voice. A keyboard 212 is connected to the controller 202, and preferably comprises a conventional telephone-type keypad or, alternatively, a full alphanumeric keyboard operable for entering data for storage in the mobile station 102, information for transmission to the network 110, one or more telephone numbers, commands to be executed on the mobile station 102, and the like. A PTT button 214 is operably connected to the controller 202 for enabling transmission in a PTT mode of the mobile station 102. Optionally, one or more auxiliary user interfaces (UI) and input/output (I/O) subsystems 216 (only one of which is depicted in FIG. 2) and suitable interfaces (not shown), are further operably connected to the controller 202.

The mobile station 102 further includes at least one battery 218, which is preferably rechargeable. The battery 218 is configured for providing electrical power to electrical circuitry residing in the mobile station 102. The battery 218 is coupled to the controller 102 via a regulator 220 configured for regulating power to the mobile station 102. Details of power distribution from the battery 218 to electrical components of the mobile station 102 are not shown, in as much as same is considered to be well-known in the art.

An RF transceiver circuitry 222, comprising a transmitter (TX) portion and a receiver (RX) portion, connected to an antenna 224, are connected to the controller 202 for providing a communication subsystem. While not show, the RF transceiver circuitry 222 may further comprise components well-known in the art, such as, by way of example and not limitation, local oscillators (LO's), processing modules such as a digital signal processor (DSP), and the like, for facilitating transmission, reception, and processing of signals. The RF transceiver circuitry 222 preferably performs functions similar to those of a radio network (such as the radio network 230 described below), such as, by way of example but not limitation, modulation/demodulation, and possibly encoding/decoding and encryption/decryption. It will be apparent to those skilled in the art that the RF transceiver circuitry 222 may be adapted to a particular wireless network or networks in which the mobile station 102 is intended to operate.

In a preferred embodiment, the controller 202 controls overall operation of the mobile station 102, and the RF transceiver circuitry 222 handles signal processing operations associated with communication functions. When the mobile station 102 is fully operational, the TX portion of the RF transceiver circuitry 222 is typically activated only when it is sending to the network 110, and is otherwise deactivated to conserve battery power. Similarly, the RX portion of the RF transceiver circuitry 222 is typically deactivated periodically to conserve battery power until it is needed to receive signals or information (if at all) during designated time periods.

As mentioned above, the mobile station 102 may operate as a single unit or, alternatively, as a multiple-module unit comprising a plurality of separate components, including but in no way limited to a computer or other device connected to a wireless modem. By way of example, in a multiple-module mobile station, the RF transceiver circuitry 222 and antenna 224 may be implemented as a radio modem unit that may be inserted into a port on a laptop computer. In such a case, the laptop computer may include the display 206, keyboard 212, and one or more auxiliary UIs 216, and the controller 102 may stand alone within the radio modem unit that communicates with the computer's CPU, or may be embodied as the computer's CPU. It is also contemplated that a computer or other equipment not normally capable of wireless communication may be adapted to connect to and effectively assume control of the RF transceiver circuitry 222 and antenna 224 of a single-unit device, such as one of those described above.

It is noted that some of the components and subsystems shown in FIG. 2 perform communication-related functions, whereas other subsystems may provide "resident" or on-device functions. Notable, some subsystems, such as keyboard 212 and display 206, for example, may be used for both communication-related functions, such as entering a text message for transmission over a communication network, and device-resident functions such as a calculator or task list. Operating system software used by controller 202 is preferably stored in a persistent store of the memory 204, such as flash memory, which may alternatively be a read-only memory (ROM) or similar storage element. Those skilled in the art will appreciate that the operating system, specific device applications, or parts thereof, may be temporarily loaded into a volatile memory 204 such as RAM.

It is understood that the mobile station 102 may optionally include a number of additional components (not shown) coupled to the controller 202, such as one or more serial and/or parallel ports, a camera, short-range communications components, other device subsystems, and the like.

A serial port may be implemented in a PDA-type communication device for which synchronization with a user's desktop (or other) computer is desirable, albeit optional. A serial port would, for example, enable a user to set preferences through an external device or software application, and would extend the capabilities of the mobile station 102 by providing for information or software downloads to the mobile station 102 other than through a wireless communication network. An alternate download path may, for example, be used to load an encryption key onto the mobile station 102 through a direct and, thus, reliable and trusted connection to thereby provide secure device communication.

A short-range communications subsystem enable communications between the mobile station 102 and different systems or devices, which need not necessarily be similar devices. For example, short-range communications subsystem may include an infrared device and associated circuits and components, or a Bluetooth™ communication module to provide for communication with similarly-enabled systems and devices. (Bluetooth™ is a registered trademark of Bluetooth SIG, Inc.).

However, as would be apparent to a skilled artisan upon a reading of the present disclosure, the particular design of a mobile station 102 and the components utilized depends on the communication network in which mobile station 202 is intended to operate.

The mobile station 102 is configured for communication in and through the communication network 110. The network 110 is preferably a Third Generation (3G) network based on Code Division Multiple Access (CDMA) technologies. In particular, the network 110 is exemplified in FIG. 2 as a CDMA2000 network which includes fixed network components coupled as shown in FIG. 2. Accordingly, the network 110 of the CDMA2000-type includes Radio Network (RN) 230 coupled for receiving signals from the base station 104. A Mobile Switching Centre/Visitor Location Register (MSC/VLR) 232 is coupled to the RN 230, a Signalling System 7 (SS7) network 234 is coupled to the MSC/VLR 232, and a Home Location Register/Authentication Centre (HLR/AC) 236 is coupled to the SS7 234. A Packet Data Serving Node (PDSN) 238 is also coupled to the RN 230, and an IP network 240 is coupled to the PDSN 238. At least one POC (PTT-over-Cellular) server 242 and a Remote Authentication Dial-In User Service (RADIUS) server 244 are coupled to the IP network 240. The SS7 network 234 is communicatively coupled to a network 250, such as a Public Switched Telephone Network (PSTN), whereas the IP network 240 is communicatively coupled to a public or private network 252, such as the Internet, an intranet, a Wireless Application Protocol (WAP) servers, and the like.

During operation, the mobile station 102 communicates via the antenna 224, the channel 106, the base station 104, and the link 108, with the RN 230 which performs functions such as call-setup, call processing, and mobility management. The RN 230 is preferably coupled to a plurality of base station transceiver systems, such as the base station 104, each of which provide wireless network coverage for a particular coverage area commonly referred to as a "cell". A given base station transceiver system of the RN 230, such as the base station 104, transmits communication signals to and receives communication signals form mobile stations, such as the mobile stations 102 and 112, within its cell. The base station transceiver system 104 includes an antenna 226 for transmitting and receiving RF signals. RN 230 performs such functions as modulation and possibly encoding and/or encryption of signals to be transmitted to the mobile station in accordance with particular, usually predetermined, communication protocols and parameters, under control of a network controller. RN 230 similarly demodulates and possibly decodes and decrypts, if necessary, any communication signals received from mobile stations within its cell. Communication protocols and parameters may vary between different networks. For example, one network may employ a modulation scheme and operate at frequencies different from other networks. The underlying services may also differ based on a particular protocol.

The wireless link 106 shown in the communication system 100 represents one or more different channels, typically different radio frequency (RF) channels, and associated protocols used between the network 110 and the mobile station 102. An RF channel is a limited resource that must be conserved, typically due to limits in overall bandwidth and limited battery power of a mobile station 102. Those skilled in the art will appreciate that a wireless network in actual practice may include hundreds of cells depending upon desired overall expanse of network coverage. All pertinent components are preferably connected by multiple switches and routers (not shown), controlled by multiple network controllers (not shown).

For all mobile stations, represented by the mobile station 102, registered with a network operator, permanent data (such as the profile of a user, also known as a subscriber, of the mobile station 102) as well as temporary data (such as the current location of the mobile station 102) are stored in the HLR/AC 236. In the case of a voice all to the mobile station 102, the HLR/AC 236 is queried to determine the current location of mobile station 102. The VLR of the MSC/VLR 232 is responsible for a group of location areas and stores the data of mobile stations that are currently in its area of responsibility. This includes parts of the permanent mobile station data that have been transmitted from HLR/AC 236 to the VLR for faster access. However, the VLR of MSC 232 may also assign and store local data, such as temporary identifications. The mobile station 102 is also authenticated on system access by the HLR/AC 236. In order to provide packet data services to the mobile station 102 in a CDMA2000-based network, the RN 230 communicates with the PDSN 238. The PDSN 238 provides access to the Internet 252 (or intranets, Wireless Application Protocol (WAP) servers, and the like) through the IP network 240. The PDSN 238 also provides foreign agent (FA) functionality in the mobile IP networks 252 as well as packet transport for virtual private networking. The PDSN 238 maintains a range of IP addresses and performs IP address management, session maintenance, and optional caching. The RADIUS server 244 is responsible for performing functions related to authentication, authorization, and accounting (AAA) of packet data services, and may be referred to as an AAA server.

The PoC server 242 operates to facilitate PoC individual and group communication sessions between mobile stations, such as the mobile stations 102 and 112, within the network 110. A conventional PoC communication session involves a session connection between end users of mobile stations, such as the mobile stations 102 and 112, also referred to as session "participants", who generally communicate one at a time in a half-duplex mode much like conventional walkie-talkies or two-way radios. PoC communication is not, however, limited to, half-duplex, and may alternatively be full-duplex.

Those skilled in art will appreciate that the network 110 may be connected to other systems, possibly including other networks, not explicitly shown in FIG. 1 or 2. The network 110 or other network will generally transmit at a minimum some sort of paging and system information on an ongoing basis, even if there is no actual packet data or other information exchanged. Although such networks comprise many parts, these parts are configured to work together to result in certain behaviours at the wireless link in a manner well-known in the art.

The mobile station 102 is configured for sending and receiving communication signals over the network 110 after required network registration or activation procedures, well-known in the art, have been completed. Signals received by the antenna 224 through the network are input to the RX portion of the RF transceiver 222, which may perform such common receiver functions as signal amplification, frequency-down conversion, filtering, channel selection, analog-to-digital (A/D) conversion, and the like. A/D conversion of a received signal allows more complex communication functions such as demodulation and decoding to be performed in a DSP. In a similar manner, signals to be transmitted are processed, including modulation and encoding, for example, by a DSP. The DSP-processed signals are input to the TX portion of the transceiver 222 for digital-to-analog (D/A) conversion, frequency-up conversion, filtering, amplification and transmission over communication network 110 via the antenna 224. A DSP not only processes communication signals, but also provides for receiver and transmitter control. For example, gains applied to communication signals in the TX and RX portions of the RF transceiver 222 may be adaptively controlled through automatic gain control algorithms implemented in a DSP.

The controller 202, in addition to its operating system functions, preferably enables execution of software applications on the mobile station 102. A predetermined set of applications which control basic device operations, including at least data and voice communication applications (such as a network re-establishment scheme), will normally be installed on the mobile station 102 during its manufacture. A preferred application that may be loaded onto mobile station 202, in the memory 204, is exemplified by a personal information manager (PIM) application having the ability to organize and manage data items relating to user such as, but not limited to, e-mail, calendar events, voice mails, appointments, and task items.

A PIM application preferably has the ability to send and receive data items via the wireless network. In a preferred embodiment, PIM data items are seamlessly integrated, synchronized, and updated via the wireless network 110, with the mobile station user's corresponding data items stored and/or associated with a host computer system, thereby creating a mirrored host computer on the mobile station 102 with respect to such items. This is especially advantageous where the host computer system is the mobile station user's office computer system. Additional applications may also be loaded onto the mobile station 102 through the network 110, the auxiliary U/I and/or I/O subsystem 216, a serial port, a short-range communications subsystem, or any other suitable subsystem, and installed by a user in the memory 204, preferably in non-volatile storage for execution by the controller 202. Such flexibility in application installation increases the functionality of the mobile station 102 and may provide enhanced on-device functions, communication-related functions, or both. For example, secure communication applications may enable electronic commerce functions and other such financial transactions to be performed using mobile station 102.

In a data communication mode of the mobile station 102, a received signal such as a text message, an e-mail message, or a web page download may be processed by the RF transceiver 222 and input to the controller 202. The controller 202 will preferably further process the signal for output to display 206, or alternatively to auxiliary I/O device 216. A user of the mobile station 102 may also compose data items, such as e-mail messages, for example, using the keyboard 212 in conjunction with the display 206 and possible the auxiliary I/O device 216. These composed items may be transmitted over a communication network through the RF transceiver 222.

For voice communications, the overall operation of the mobile station 102 is substantially similar as with data communications, expect that the received signals are output to the speaker 206, and signals for transmission are generated by the microphone 210. Alternative voice and/or audio I/O subsystems, such as a voice message recording subsystem, may also be implemented on the mobile station 102. Although voice or audio signal output is preferably accomplished primarily through the speaker 208, the display 206 may also be used to provide an indication of the identity of a calling party, duration of a voice call, or other voice call related information, as some examples.

Figure 3:
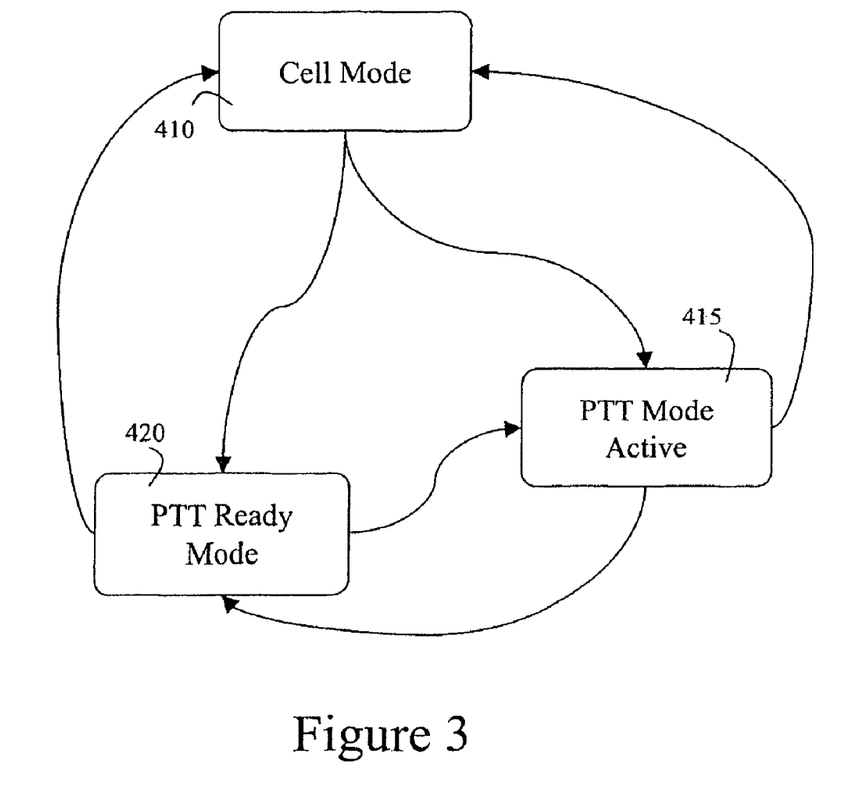
FIG. 3 is a state diagram illustrating various states a mobile station may enter.

Reference is now made to FIG. 3. FIG. 3 shows a state diagram in which the mobile station can be configured in one of three states. A first state is the cellular mode state. A mobile station that does not expect a PTT call in the near future will stay in this state for most of the time. As will be appreciated, in this state the mobile station does not wake up to check paging channels as frequently as it does in the other two modes below, and thus being in this state saves battery life. In one example, in the cell mode the mobile station may wake up every 2.5 seconds to check the paging channel whereas when the mobile station is in a PTT mode it wakes up every 0.5 seconds or shorter.

A user may wish to be in PTT mode at various times. As illustrated in FIG. 3, the mobile station can be configured in a PTT ready mode without an active session in state 420 or be in a PTT mode with an active session in state 415.

A user may configure the mobile station to enter a PTT ready mode without a session if, for example during certain times of the day the user knows that they can expect a PTT call. For example, during work hours if a user needs to be connected in a PTT mode any time, the user may enter into the PTT ready mode without a session being established.

Once the user is in a PTT ready mode without a session, the user may be invited to join a PTT session to put the user into an active PTT mode more quickly than being invited to join a PTT session and enter the active PTT mode from a cellular mode.

A user has three ways to join an active PTT mode. The first is to be invited, the second is to invite other people and the third is to join existing sessions.

The mobile station can further be configured to drop the PTT active mode when an event happens. The event can be, for example, when the active PTT session ends, or a time-out in which no PTT traffic has occurred for a preset time period, or it can be based on other conditions such as the user ending the PTT active mode manually. Other options would also exist as would be apparent to those skilled in the art.

Once a PTT active mode is dropped, the mobile station has two options. A first option is to move back into state 420 in which the user is in a PTT ready mode with no session. A second option is to move into state 410 in which the user is again in a cellular mode. As will be appreciated by those skilled in the art, the mode that the mobile station is in will determine the average connection time for PTT call. However, the trade-off is with respect to battery life. Since, in the active PTT mode or in PTT ready mode, the mobile station will, in one instance, check the paging channel more frequently, battery life is drained more quickly.

Figure 4:
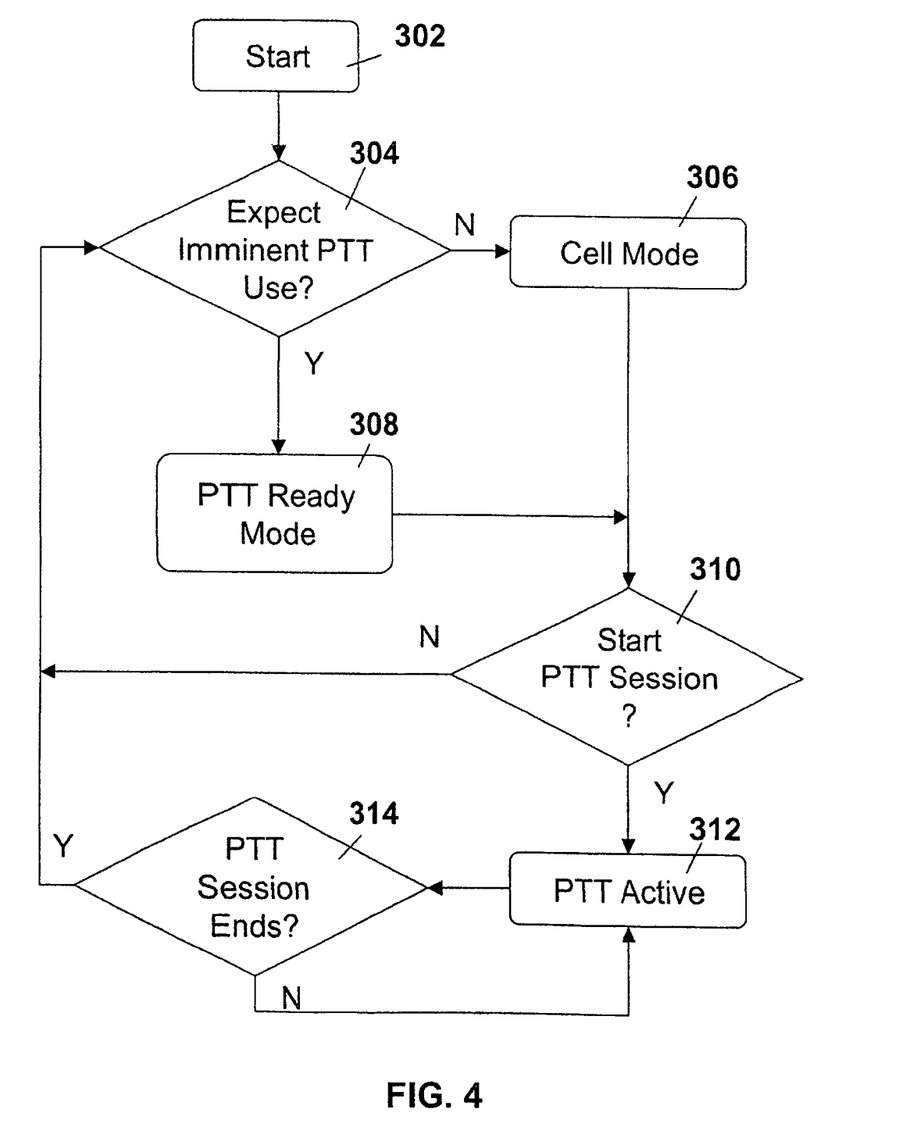
FIG. 4 is an exemplary flow chart illustrating one sequence of steps that may be followed for implementing features of mobile station and networks of FIG. 1 and FIG. 2 in accordance with the principles of the present application.

Reference is now made to FIG. 4. FIG. 4 illustrates a flow chart of an exemplary sequence of steps that may be followed for implementing the method and system of the present application. Specifically, a user (or the mobile station) in step 304 will determine whether an imminent PTT call is expected. If no, the mobile station enters the cellular mode in step 306. As will be appreciated, the cellular mode is state 410 from FIG. 3.

If in step 304 the user (or the mobile station) determines that an imminent PTT use is expected then the mobile station proceeds to elect a PTT ready mode of operation in step 308, which is state 420 in FIG. 3. The PTT ready mode may be predetermined by the PTT service provider, for example, according to the level of subscription, or may be user selectable, as described in more detail below, according to, e.g., the trade-off between quality of service, and battery life and service charges.

Those skilled in the art will appreciate that there may be variously ways of implementing the condition check in step 304. In one example, when a user expects imminent PTT calls, the user will set the mobile station to be place to PTT ready mode 308, or otherwise, to be placed to cell mode 306. The action of setting may actually set a flag in the mobile station software to indicate the decision, and whenever the software needs to decide in step 304, the software will only check the status of the flag and accomplish the decision, without further user intervention. In another example, the user may pre-program the mobile station to set the flag automatically, such as based on predetermined time of day. For example, a user's working hours may be between 9 am to 5 pm, the user may program the mobile station to automatically set the flag to indicate a decision to "Yes" when the time of day is within this working hours. In yet another example, an automatic flag setting involved for the decision in step 304 may be based on a timer to set the flag to "Yes" or "No" if the user enable this feature. The timer resets every time when an active PTT traffic activity ends; before the timer expires the flag is set to make the decision to "Yes" and after the timer expires, the flag is set to make the decision to "No". The timer gives a likelihood estimation for imminent PTT calls after the most recent PTT traffic activity. Other ways of statistical based estimation of the likelihood estimation may also be used to set the flag.

Various options and techniques, either alone or in combination, can be used to build the PTT ready mode and the idle sub-state in a PTT active mode in order to allow the user to select the quality of service desired and trade off with the battery usage and service charge where applicable. These techniques include:

1. Using a Non-Slotted Mode

The mobile station, instead of using a slotted mode, may go to a non-slotted mode. As will be appreciated by those skilled in the art, the response time to and the chance of successful decoding of a paging message in this mode is superior to the slotted mode, whereas the battery life in this mode is degraded. The mobile station will continuously monitor the paging channel from the base station to determine whether someone is trying to communicate with the mobile station and can instantly respond, without having to wait for the next wake-up slot.

The base station, in this option, must be told that the mobile station has moved to a non-slotted mode. Currently such messages exist in present CDMA systems.

2. Reduce Slot Cycle Time

A second option to increase the quality of service is to reduce the slot cycle time in a slotted mode. If the slot cycle time is reduced, the mobile station will still be able to respond quickly to a page message. In this case, as will be appreciated, the mobile station will not be able to react as quickly as on a non-slotted mode under the first option above but if the slot cycle time is selected to be small enough, the delay to respond to a paging message can be minimized.

The slot cycle time can be set to any time that can be accommodated by the base station. The base station needs to also be configured to use the new frequency and time position parameters and the frequency increase can depend on the grade of service that a user desires.

In an exemplary system, the new paging slot cycle can be set as low as 125 milliseconds or in a range from 75 to 125 ms. However this is not meant to be limiting and in other standards shorter slot times may be available.

3. Multiple Numbers

A third option to increase the quality of service by reducing page response time is to assign multiple phone numbers to a mobile station. These numbers would be staggered on the different paging channel slots in their slotted mode. When a PTT call is to be sent to the mobile station, the paging message is sent to all the multiple phone numbers associated with the mobile station to ensure that the mobile station receives a paging message more frequently. As will be appreciated, this method can be used in existing standard versions (such as IS-2000 version 0) to enable shorter effective slot cycle time than the standard version normally can do, without upgrading to newer standard versions (such as IS-2000 C). The mobile station would monitor the multiple numbers and could thus react quickly if a PTT call is initiated to it.

As described in more detail in the table below, this option is available either by itself or in combination with option number two above.

4. Assign a Separate Paging Channel

Paging messages are queued, and if a significant number of paging messages exist, the queuing delay in paging channel will increase the page response time for the PTT call. One option to overcome this is to assign a separate paging channel with a lower load to a subset of users for a push-to-talk service. Carriers may be able to bill the assignment of a lower load paging channel at a higher rate but this may still be desirable for a user who desires higher quality of service. The assignment of a separate paging channel can be done at the base station, either based on a message from the mobile station or independently based on various parameters and presets.

As illustrated in the table below, option four can be used in conjunction with any of options 1, 2, or 3.

5. Multicast Paging when in the Same Cell or Sector

If a group of users communicating with each other in the same PTT session are in the same cell or sector, the base station may multicast the users using a single paging message. If the group of phones operate in a non-slotted mode as described in option 1 above, the multicast paging can be carried out by recognizing a multicast ID or the PTT session ID embedded in the paging message. If the group of mobile stations are in slotted mode, assigning them the same paging slot will facilitate the multicast. This is contrary to many present systems in which the paging slot is assigned based on a hash of the mobile station phone number. Alternatively, if multiple slots associated with multiple numbers are assigned for each mobile station as in option 3 above, then the group of users can occupy the same set of multiple slots to facilitate the multicast paging. Again, for these cases, a multicast ID or the PTT session ID embedded in the paging message can be used for the mobile stations to recognize that the multicast message is intended for the mobile stations.

The technique of option 5 can be used in conjunction with any of options 1, 2, 3 or 4.

6. Assign a Lower Loaded Access Channel

Options 1 to 5 above dealt with the receipt of a PTT call and the monitoring of the paging channel for this. The PTT call can also be optimized on the transmit side by assigning a separate and lower loaded access channel, enhanced access channel or common control channel that can be used for the participating push-to-talk users to reduce the chance of access collision. By assigning a lower loaded access channel, the reduced chance of an assess collision will decrease the average access time for a user talking to the PTT group. This setting may be dependent on the selected grade of service and can be billed differently depending on the service selected.

Option 6 can be used with any of options 1 to 5 above.

7. Increase Transmit Power for Access Probes of PTT Calls

In present systems, if a mobile station attempts to communicate with other push-to-talk users, access probes are used to send access messages. A first probe is sent at a first power. If the first probe is unsuccessful then the mobile station increases the power and tries again until the maximum number of power steps are reached. One option is to increase the power of access probes to be higher than the power level used in regular calls to allow a higher chance to gain access in the first probe, and if still not successful with a higher power in the first probe, in following probes. Again, this setting may be dependent on the selected grade of service and can be billed differently.

In a preferred configuration, the base station can broadcast a parameter that defines the level of increase allowed and the carrier may bill more if this increased power level is used.

As illustrated in the table below, option 7 can be used with any of options 1 to 6.

8. Assign a Lower Loaded Frequency Channel

For areas demanding high capacity, multiple frequency channels are deployed. In such areas, participating push-to-talk users can be assigned to lower loaded frequency channels with priority. Again, this setting may be dependent on the selected grade of service and can be billed differently from the regular service.

As illustrated in the table below, this option can be used in conjunction any of options 1 to 7. However, the lower loaded access or paging channels might not be as significantly beneficial since the frequency is less loaded already.

9. Using a Gated Traffic Channel

At an even higher grade than a non-slotted mode, an all-the-time initiating and listen grade mode can be implemented by a gating traffic channel. This reduces connection time in both receiving and transmitting PTT activities by preventing the need to establish a traffic channel. However, battery life has to be sacrificed. To mitigate the battery life loss, a gated mode traffic channel is used during idle periods to save battery consumption to a certain degree.

In this option, a traffic channel is open for transmission and reception at substantially all times during a PTT session as well as prior to a PTT session to be ready for a session to open. Gated technology is used to ensure that the mobile station 102 does not need to transmit and receive 100 percent of the time while idle, thereby conserving battery power. Gating technology is defined in IS-95 and IS-2000 and, in IS-2000, the IS-95 counterpart is referred to as radio configuration 1 or 2, or RC1 or RC2, respectively. In RC1 or RC2, when a user is actively talking, the mobile station 102 is transmitting at "full rate", that is, 100 percent of the time, or 9.6 kbps for RC1, or for 14.4 kbps for RC2. However, when the user is not talking, the mobile station 102 transmits either at one-half rate or one-eighth rate. The transmitter is only on during the portion of time that the mobile station is transmitting. The transmitter is turned off in the remaining time period. The one-eighth rate can be borrowed for use in this PTT ready mode and the idle sub-state of the PTT active mode.

While the one-eighth gating rate helps to conserve battery power, in a preferred embodiment of the present invention, a new radio configuration would be defined so that the gated-on percentage of time (i.e. duty cycle) is less than one-eighth, to thereby further conserve battery power. To that end, it would be preferable to have one or two gated-on periods of about 1.25 milliseconds each approximately every 100 milliseconds for PTT operation, resulting in a preferred duty cycle of 1/80 or 1/40 respectively.

Multiple push-to-talk users in a cellular sector can be assigned to different or pseudorandom gating time slots that have a very low chance of overlapping with each other in time to reduce the chance of burst interference on a network.

As will be appreciated by those skilled in the art, option 9 has a higher grade than option 1 because in option 1 there is still the possibility of collisions in transmitting access probes whereas in option 9 this is eliminated. The mode in option 9 is available both for transmitting and receiving at very reliable periodic time slots.

In order to define the quality of service for the push-to-talk mode, one or more of the above can be used in conjunction with each other. While it does not make sense that certain options be used together, for example the use of a non-slotted mode with the decreasing of a slot time, some other options can be used together. This is illustrated in the table below which indicates the option on the top and left side, wherein a Y indicates that the option on the left side can be used in conjunction with the option above and an N indicates that it cannot be used in conjunction with the option above.

TABLE A

|   | 1 | 2 | 3 | 4 | 5 | 6 | 7 | 8 | 9 |
|---|---|---|---|---|---|---|---|---|---|
| 1 | — | N | N | Y | Y | Y | Y | Y | N |
| 2 | N | — | Y | Y | Y | Y | Y | Y | N |
| 3 | N | Y | — | Y | Y | Y | Y | Y | N |
| 4 | Y | Y | Y | — | Y | Y | Y | Y | N |
| 5 | Y | Y | Y | Y | — | Y | Y | Y | N |
| 6 | Y | Y | Y | Y | Y | — | Y | Y | N |
| 7 | Y | Y | Y | Y | Y | Y | — | Y | N |
| 8 | Y | Y | Y | Y | Y | Y | Y | — | N |
| 9 | N | N | N | N | N | N | N | N | — |

By the use of the method and system of the present application, a service provider is given the option to define the modes or grades of PTT service in terms of response time, and a user may also be given the option to select a mode for establishing a PTT session based on a number of factors, including battery power consumption, response times and cost, thereby enabling a user to obtain faster PTT paging response times and/or conservation of battery power. Such selection may be performed through a user interface on the mobile station on the fly, or can be pre-subscribed from a carrier.

Once the PTT ready modes the user desires are elected, the mobile station communicates with the base station to establish the PTT ready modes. Thus, for example, if the user selects a non-slotted mode, the mobile station needs to communicate this option to the base station to ensure the base-station does not use a slotted mode but instead passes the information to the mobile station immediately.

Similarly, if the paging slot cycle time is reduced, the base station must be told to reduce the slot cycle time or if multiple numbers are assigned, the base station needs to be informed to use the next paging slot for whichever number is coming up next.

The assignment of a separate paging channel is done based on a request to the base station for a separate paging channel and the assignment of the paging channel by the carrier, which is conveyed to the mobile station through the base station.

If the PTT ready mode asks for multicast and works with a slotted mode, it needs to establish the same paging slot for multiple users within the same cell or sector, this also must be coordinated by the base station. Similarly, the establishment of a lower loaded access channel will need to be coordinated with the base station.

The mobile station can increase the access probe power on its own for PTT calls, if standards are redefined to allow it without a request to the base station. Alternatively, the standards may be modified to allow an increase in access probe power that complies with constraints established by the serving base station and is communicated to the mobile station.

The assignment to a lower loaded channel can be performed by the base station upon the base station being told of the mobile station wanting a higher quality of service. This could be accomplished through messages between the mobile station and the base station. The assignment to a lower loaded channel can also be preconfigured at the base station side for mobile stations subscribing to a PTT service.

A message will need to be passed from the mobile station to the base station to establish a gated traffic channel. Other hand shaking routines will also be required subsequently.

From step 308, the mobile station, can proceed to step 310. In step 310 the mobile station checks whether it needs to start an active PTT session, e.g., by checking a status flag set by user interface, or by checking whether there is any incoming invitation to join a PTT session. If yes, the mobile station proceeds to step 312 in which it moves into an active PTT session. Otherwise, the mobile device proceeds from step 310 to step 304 in which a query is made again whether imminent PTT use is expected.

From step 312, the mobile station proceeds to step 314 in which it queries wither the PTT Session has ended. This can occur through various means that would be known to those skilled in the art. If the mobile device finds in step 314 that the PTT session has not ended, it proceeds back to step 312 and continues to loop between steps 312 and 314 until the PTT session ends.

Once the PTT session ends, the mobile device proceeds from step 314 back to step 304 in which it again determines whether imminent PTT use is expected.

The above steps are executed repeatedly while the mobile station is turned on.

It is understood that the present system and method may take various forms and embodiments, accordingly, several variations may be made in the foregoing with departing from the spirit and scope of the present application. For example, the present system and method may be implemented using voice-over IP (VoIP) technology and/or it may be implemented in a single duplex mode or in a circuit switch mode. The invention may be adapted to allow each user to select different PTT ready-mode, and/or a buffer may be provided in combination therewith to compensate for a user that selects a slower PTT ready mode.

The above embodiments are meant to be illustrative rather than limiting in nature and a wide range of variations, modifications, changes and substitutions are contemplated in the foregoing disclosure and, in some instances, some features of the present application may be employed without a corresponding use of the other features. Many such variations and modifications may be desirable by those skilled in the art based upon a review of the foregoing descriptions and preferred embodiments. Accordingly, the present application is not meant to be limited to the disclosure above and is only meant to be limited by the claims below.

We claim:

1. A method for configuring a Push-to-Talk (PTT) mobile station having a plurality of modes including a PTT active mode, a PTT ready mode and a cellular mode, said PTT ready mode being a state of the mobile station in which no PTT session is established but which provides a shorter transition time into a PTT active mode than from the cellular mode, the method comprising the steps of:

enabling selection of a PTT ready mode technique at the device, from one or multiple techniques for building the PTT ready mode;

sending a configuration message to a base station to request grant of a PTT ready mode based on the PTT ready mode technique selected;

configuring the mobile station for the PTT ready mode that is granted by the base station and enabling the PTT ready mode based on the configuration granted by the base station, wherein the one or multiple techniques are selected from the group consisting of:

a) a non-slotted paging technique, said sending step sending a message to the base station to establish a non-slotted paging channel communication with the mobile station, the configuring step rendering the mobile station operable in the non-slotted mode;

b) a reduced paging slot cycle time technique, said sending step sending a message to the base station to establish a reduced slot cycle time channel communication with the mobile station, the configuring step rendering the mobile station operable in a mode using the reduced slot cycle time technique;

c) a multiple phone number assignment technique, said sending step sending a message to the base station to map multiple numbers to the mobile station, the multiple numbers having staggered paging slots, the configuring step rendering the mobile station operable in a mode using the multiple number assignment technique for the reception of paging messages sent to said mobile station via said phone numbers;

d) a separate paging channel assignment method, said sending step sending a message to the base station to have the base station assign a paging channel with a lower load to the mobile station, the configuring step configuring the mobile station listen to the lower load paging channel;

e) a multicast paging technique, said sending step sending a message to the base station to inform the base station capable of receiving multicast messages to a group of users who are in a single cell or sector, the configuring step configuring the mobile station to accept instructions from the base station to receive multicast messages sent to a group of users who are in a single cell or sector;

f) a lower loaded access channel technique, said sending step sending a message to the base station to have the base station assign a separate access channel with a lower load to the mobile station, the configuring step configuring the mobile station to transmit using the lower loaded access channel;

g) an increased PTT access probe power technique where access probes are used to send access messages, said configuring step configuring the mobile station to increase a power level of access probe transmission higher than that of a mobile station not using said technique;

h) a lower loaded frequency technique, said sending step sending a message to the base station to have the base station assign a lower loaded frequency channel to the mobile station, the configuring step configuring the mobile station to use the lower loaded frequency channel in response to received instructions from the base station; and i) a gated traffic channel technique, said sending step sending a message to the base station to configure a gated traffic channel transmission in idle condition, the configuring step rendering the mobile station operable in the gated traffic channel technique, where the mobile station can elect the use of the PTT ready mode techniques in accordance with the following table, in which a yes indicates the technique at a column head can be used with a technique at a row head and the letter at the column head and row head corresponds with the letters beside the techniques in this claim:

|   | A | B | c | d | e | f | g | h | i |
|---|---|---|---|---|---|---|---|---|---|
| a | — | No | No | Yes | Yes | Yes | Yes | Yes | No |
| b | No | — | Yes | Yes | Yes | Yes | Yes | Yes | No |
| c | No | Yes | — | Yes | Yes | Yes | Yes | Yes | No |
| d | Yes | Yes | Yes | — | Yes | Yes | Yes | Yes | No |
| e | Yes | Yes | Yes | Yes | — | Yes | Yes | Yes | No |
| f | Yes | Yes | Yes | Yes | Yes | — | Yes | Yes | No |
| g | Yes | Yes | Yes | Yes | Yes | Yes | — | Yes | No |
| h | Yes | Yes | Yes | Yes | Yes | Yes | Yes | — | No |
| i | No | No | No | No | No | No | No | No | —. |

2. The method of claim 1, wherein said reduced paging slot cycle time technique allows the slot cycle time to be reduced to a range from 75 to 125 milliseconds.

3. The method of claim 1, wherein the configuring step in the increased PTT access probe power technique chooses the access probe power level to correspond with a permitted amount of increase in power level as conveyed by the base station to the mobile station.

4. The method of claim 1, wherein the gated traffic channel technique allows for a one-eighth rate gating traffic channel in the mobile transmitted signals while idling.

5. The method of claim 1, wherein the gated traffic channel technique allows for a gating duty cycle of ¼0 or ⅛0 in the mobile transmitted signals while idling.

6. A method for configuring a Push-to-Talk (PTT) mobile station having a plurality of modes including a PTT active mode, a PTT ready mode and a cellular mode, said PTT ready mode being a state of the mobile station in which no PTT session is established but which provides a shorter transition time into a PTT active mode than from the cellular mode, the mobile station comprising the steps of:

enabling selection of a PTT ready mode technique at the device from one or multiple techniques selected from a plurality of techniques;

sending a message to a base station to request a PTT ready mode for PTT service based on the one or multiple techniques selected;

negotiating with the base station for agreement for the PTT ready mode; and configuring the mobile station for the PTT ready mode agreed to, wherein the one or multiple techniques are selected from the group consisting of:

j) a non-slotted paging technique, said sending step sending a message to the base station to establish a non-slotted paging channel communication with the mobile station, the configuring step rendering the mobile station operable in the non-slotted mode;

k) a reduced paging slot cycle time technique, said sending step sending a message to the base station to establish a reduced slot cycle time paging channel communication with the mobile station, the configuring step rendering the mobile station operable in a mode using the reduced slot cycle time technique;

l) a multiple phone number assignment technique, said sending step sending a message to the base station to map multiple numbers to the mobile station, the multiple numbers having staggered paging slots, the configuring step rendering the mobile station operable in a mode using the multiple number assignment technique for the reception of paging messages sent to said mobile station via said phone numbers;

m) a separate paging channel assignment method, said sending step sending a message to the base station to have the base station assign a paging channel with a lower load to the mobile station, the configuring step configuring the mobile station listen to the lower load paging channel;

n) a multicast paging technique, said sending step sending a message to the base station to inform the base station capable of receiving multicast messages to a group of users who are in a single cell or sector, the configuring step configuring the mobile station to accept instructions from the base station to receive multicast messages sent to a group of users who are in a single cell or sector;

o) a lower loaded access channel technique, said sending step sending a message to the base station to have the base station assign a separate access channel with a lower load to the mobile station, the configuring step configuring the mobile station to transmit using the lower loaded access channel;

p) an increased PTT access probe power technique access probes are used to send access messages, said configuring step configuring the mobile station to increase a power level of access probe transmission higher than that of a mobile station not using said technique;

q) a lower loaded frequency technique, said sending step sending a message to the base station to have the base station assign a lower loaded frequency channel to the mobile station, the configuring step configuring the mobile station to use the lower loaded frequency channel in response to received instructions from the base station; and r) a gated traffic channel technique, said sending step sending a message to the base station to configure a gated traffic channel transmission in idle condition, the configuring step rendering the mobile station operable in the gated traffic channel technique, where the mobile station can elect the use of the PTT ready mode techniques in accordance with the following table, in which a yes indicates the technique at a column head can be used with a technique at a row head and the letter at the column head and row head corresponds with the letters beside the techniques in this claim:

| | A | B | c | d | e | f | g | h | i |
|---|---|---|---|---|---|---|---|---|---|
| a | — | No | No | Yes | Yes | Yes | Yes | Yes | No |
| b | No | — | Yes | Yes | Yes | Yes | Yes | Yes | No |
| c | No | Yes | — | Yes | Yes | Yes | Yes | Yes | No |
| d | Yes | Yes | Yes | — | Yes | Yes | Yes | Yes | No |
| e | Yes | Yes | Yes | Yes | — | Yes | Yes | Yes | No |
| f | Yes | Yes | Yes | Yes | Yes | — | Yes | Yes | No |
| g | Yes | Yes | Yes | Yes | Yes | Yes | — | Yes | No |
| h | Yes | Yes | Yes | Yes | Yes | Yes | Yes | — | No |
| i | No | No | No | No | No | No | No | No | —. |

* * * * *